US007977845B1

(12) United States Patent
Heitmann (10) Patent No.: US 7,977,845 B1
(45) Date of Patent: Jul. 12, 2011

(54) INDUCTION MOTOR (76) Inventor: Arnold M. Heitmann, Swampscott, MA (US)

(*) Notice: Subject to any disclaimer, the term of this patent is extended or adjusted under 35 U.S.C. 154(b) by 0 days.

(21) Appl. No.: 12/987,839

(22) Filed: Jan. 10, 2011

Related U.S. Application Data (60) Provisional application No. 61/323,073, filed on Apr. 12, 2010, provisional application No. 61/293,990, filed on Jan. 11, 2010.

(51) Int. Cl.
*H02K 9/00* (2006.01)
*H02K 9/06* (2006.01)
*H02K 1/22* (2006.01)
*H02K 21/12* (2006.01)

(52) U.S. Cl. ........... 310/261.1; 310/52; 310/54; 310/58; 310/60 R; 310/156.12; 310/62; 310/63

(58) Field of Classification Search ............ 310/63, 310/52, 54, 58, 60 R; *H02K 1/22, 9/00, 9/06, H02K 21/12*
See application file for complete search history.

(56) References Cited

U.S. PATENT DOCUMENTS

| | | | | |
|---|---|---|---|---|
| 4,055,370 A | * | 10/1977 | Cunningham | 384/130 |
| 4,577,128 A | * | 3/1986 | Gould et al. | 310/87 |
| 4,679,314 A | * | 7/1987 | Lenz et al. | 29/598 |
| 4,754,179 A | * | 6/1988 | Capuano et al. | 310/71 |
| 5,801,470 A | * | 9/1998 | Johnson et al. | 310/156.27 |
| 5,913,548 A | * | 6/1999 | Keck | 29/596 |
| 7,208,854 B1 | * | 4/2007 | Saban et al. | 310/61 |
| 2002/0171320 A1 | * | 11/2002 | Wang et al. | 310/261 |
| 2004/0046474 A1 | * | 3/2004 | Kalsi | 310/179 |
| 2006/0131981 A1 | * | 6/2006 | Bray et al. | 310/216 |
| 2009/0230804 A1 | * | 9/2009 | Legros et al. | 310/183 |
| 2010/0215526 A1 | * | 8/2010 | Saari et al. | 417/423.8 |

FOREIGN PATENT DOCUMENTS

WO WO2007030572 * 3/2007

* cited by examiner

*Primary Examiner* — Quyen Leung
*Assistant Examiner* — Terrance Kenerly
(74) *Attorney, Agent, or Firm* — McCarter & English, LLP

(57) ABSTRACT

Exemplary embodiments of the present invention relate to an induction motor including a stator having a circular cross-section and an inner passage having a longitudinal axis defining a bore, a solid core steel rotor having a circular cross-section rotatably disposed within the bore of the stator, and an air gap disposed between the rotor and the stator. A copper conductive layer is disposed on the steel rotor to increase the electrical conductance of the rotor. Exemplary embodiments adhere the copper conductive layer to the steel rotor using Hot Isostatic Pressing (HIP). The HIP process encloses the steel rotor and the copper conductive layer in a containment vessel, and adheres the conductive layer to the rotor by applying high temperature and high gas pressure to the outside of the containment vessel.

5 Claims, 14 Drawing Sheets

AXIAL FLOW FAN WITH ITS STATOR INSTALLED IN AIR GAP FLOW PATH.

FIG. 1

AXIAL FLOW FAN WITH ITS STATOR
INSTALLED IN AIR GAP FLOW PATH.

FIG. 2

FINAL SHAFT AFTER HIP PROCESS AND STEEL CASINGS MACHINED OFF WITH FINAL COPPER DIAMETER, END CAPS AND SHAFT DETAILS MACHINED.

SHAFT MANDREL IN PREPARATION FOR HIP PROCESS

FIG. 6

COPPER CAP CONFIGURATION
BEFORE HIP

FIG. 7

COPPER SLEEVE BEFORE
HIP PROCESS

FIG. 8

COPPER SLEEVE AND END CAPS ASSEMBLY BEFORE HIP

FIG. 9

ASSEMBLY READY FOR HIP

FIG. 14
MCE OIL SUPPLY SYSTEM

FIG. 15

INDUCTION MOTOR

RELATED APPLICATIONS

This application is related to and claims priority to U.S. Provisional Application Ser. No. 61/293,990 filed Jan. 11, 2010 and to U.S. Provisional Application Ser. No. 61/323,073 filed Apr. 12, 2010. The entire contents of the aforementioned applications are expressly incorporated herein by reference in their entirety.

BACKGROUND

Induction motors known as solid rotor machines include a stator and a solid steel rotor rotatably disposed within a bore of the stator. A conductive layer may be provided on the outer operating surface of the rotor to increase the electrical conductance in the rotor. Conventional techniques of providing a copper layer on a steel rotor make use of air and electric means of propelling high-velocity molten copper against the rotor surface. Examples of such conventional techniques include blast coating and vapor deposition.

Conventional techniques do not produce adequate adhesion of the copper conductive layer to a solid core steel rotor. The copper-steel bond created by conventional techniques is not adequately strong to withstand high rotational speeds. Additionally, these techniques lead to oxidation and porosity of the copper conductive layer. Oxidation and porosity of the resulting copper conductive layer raises the electrical resistance, which necessitates a thicker conductive layer. The rise in electrical resistance increases the apparent air gap between the rotor and the stator, and leads to higher electrical losses in the motor.

SUMMARY

Exemplary embodiments of the present invention avoid the shortcomings of conventional techniques of providing a conductive layer on a steel rotor by using Hot Isostatic Pressing (HIP) to adhere the conductive layer to the steel rotor. In exemplary embodiments, the conductive layer is pure or substantially pure copper layer, and the rotor is a solid core steel rotor. The HIP process encloses the solid core steel rotor, a copper layer sleeve, and two copper layer end caps in a containment vessel, and adheres the copper layer sleeve and end caps to the solid core steel rotor by applying high temperature and high gas pressure to the outside of the containment vessel.

The HIP process creates a strong integral bond between the steel rotor and the copper layer. The resulting copper layer adhered to the rotor is non-porous, which improves its performance as an electrical conductor between the rotor and the stator. The resulting copper layer is also free of contaminants like oxidation, moisture, oil, etc., and is not affected by oxidation on the faying surfaces. These properties also enhance the electrical conductance between the rotor and the stator.

In accordance with one exemplary embodiment, an induction motor is provided. The induction motor includes a stator having a circular cross-section and an inner passage having a longitudinal axis defining a bore. The induction motor also includes a steel rotor having a circular cross-section rotatably disposed within the bore of the stator. The rotor includes an axial fan that directs incoming air in an axial direction around the rotor.

In accordance with another exemplary embodiment, an induction motor is provided. The induction motor includes a stator having a circular cross-section and an inner passage having a longitudinal axis defining a bore. The induction motor also includes a solid core steel rotor having a circular cross-section rotatably disposed within the bore of the stator. The induction motor further includes a layer of copper integrally adhered to the outer surface of the solid core steel rotor using Hot Isostatic Pressing (HIP).

In accordance with yet another exemplary embodiment, an induction motor is provided. The induction motor includes a stator having a circular cross-section and an inner passage having a longitudinal axis defining a bore. The induction motor also includes a solid core steel rotor having a circular cross-section rotatably disposed within the bore of the stator. The rotor includes an axial fan that directs incoming air in an axial direction around the rotor. The induction motor further includes a layer of copper integrally adhered to the outer surface of the solid core steel rotor using Hot Isostatic Pressing (HIP).

In accordance with still another exemplary embodiment, a method of manufacturing a solid core steel rotor in an induction motor is provided. The method includes adhering a copper layer over an outer surface of the solid core steel rotor using Hot Isostatic Pressing (HIP).

In accordance with a further exemplary embodiment, an oil applicator for lubricating motor bearings is provided. The oil applicator includes felt applicator that allows uniform distribution of oil from the oil applicator. The oil applicator applies oil onto an oil slinger that slings oil onto the motor bearings.

In accordance with yet another exemplary embodiment, a method of lubricating motor bearings is provided. The method includes distributing oil uniformly using a felt applicator of an oil applicator. The method also includes slinging the oil onto the motor bearings using an oil slinger in close proximity to the oil applicator.

In accordance with still another exemplary embodiment, an induction motor is provided. The induction motor includes bearings that are lubricated using an oil applicator. The oil applicator includes felt that allows uniform distribution of oil from the oil applicator. The oil applicator applies the oil onto an oil slinger that slings oil onto the motor bearings.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

Exemplary embodiments of the present invention relate to a solid rotor induction motor including a stator having a circular cross-section and an inner passage having a longitudinal axis defining a bore, a solid core steel rotor having a circular cross-section rotatably disposed within the bore of the stator, and an air gap disposed between the rotor and the stator. A copper conductive layer is disposed on the outer surface and end surfaces of the steel rotor to increase the electrical conductance of the rotor. Exemplary embodiments adhere the copper conductive layer to the steel rotor using Hot Isostatic Pressing (HIP). The HIP process encloses the steel rotor and the copper conductive layer in a containment vessel, and adheres the conductive layer to the rotor by applying high temperature and high gas pressure to the outside of the containment vessel.

The resulting conductive layer adhered to the rotor is non-porous, which improves its performance as an electrical conductor between the rotor and the stator. The resulting conductive layer is also free of contaminants like moisture, oil, etc., and is not affected by oxidation on the faying surfaces. These properties also enhance the electrical conductance between the rotor and the stator.

Figure 1:
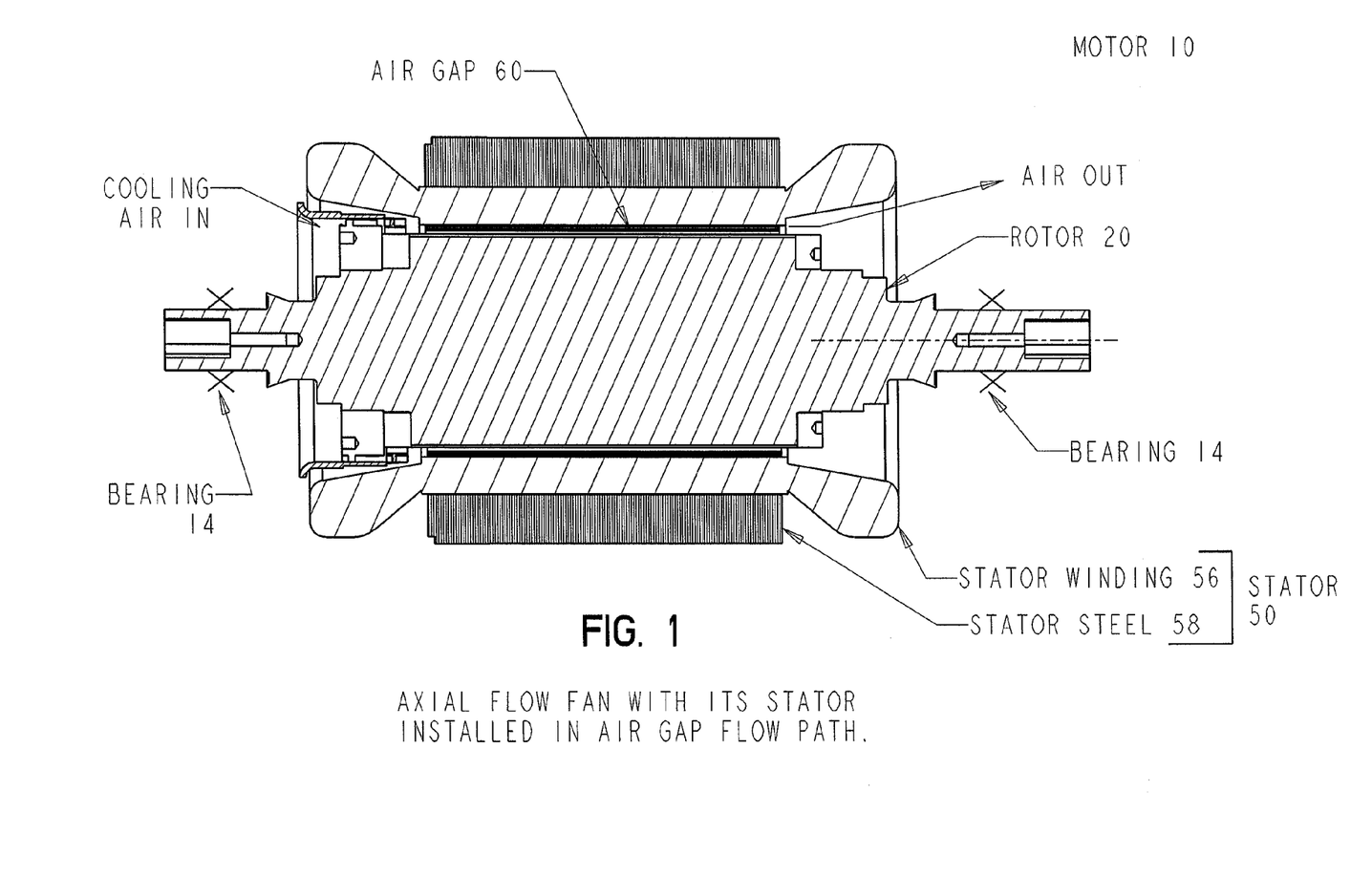
FIG. 1 illustrates an exemplary motor provided in accordance with exemplary embodiments.

FIG. 1 illustrates an exemplary motor 10. The motor 10 includes bearings 14, a stator 50, and a rotor 20 mounted within a bore of the stator 50. In exemplary embodiments, the motor 10 runs typically between about 30,000 and 100,000 rpm.

The stator 50 includes stator winding 56, an inner surface 54 facing the rotor 20, and a bore 52 extending along a longitudinal axis X.

An air gap 60 is formed between the inner surface 54 of the stator 50 and a conductive layer 30 provided over the outer surface of the rotor 20. In exemplary embodiments, the air gap 60 has a thickness of 0.1 inches. Cool air is introduced through the rotor 20, and is thereafter applied axially through the air gap 60.

The size of the air gap 60 has significance in the high-speed technical applications of the motor 10, especially with relation to its efficiency. More specifically, increasing the air gap optimizes the efficiency of the motor by decreasing drag losses. As such, the air gap in exemplary embodiments has an average thickness of 0.1 inches, which is substantially larger than conventional air gaps which have an average thickness of 0.015 inches. U.S. Pat. No. 5,473,211 discusses the relationship between the air gap thickness and motor efficiency, and is herein incorporated in its entirety by reference.

Providing a thicker air gap in exemplary embodiments permits sufficient cooling air to be applied axially to the air gap 60, which provides a heat sink for both the rotor 20 and the stator 50. An unexpected result of exemplary embodiments is that the flow of cooling air through the air gap 60 adequately cools the rotor 20 and the stator 50 with minimum power consumption. The motor 10 may thus operate efficiently without an external or auxiliary mechanism cooling the rotor 20 and the stator 50.

The rotor 20 is rotatably disposed within the bore 52 of the stator 50 along the longitudinal axis X. The rotor 20 rotates relative to the stator 50. The rotor 20 includes a shaft body 22, and a conductive layer 30 that is adhered to the entire operating outer surface of the rotor 20 using the Hot Isostatic Pressing (HIP) process. The shaft body 22 is magnetically and electrically conductive, and may be solid or hollow. The outer surface of the shaft body is integral, but can be identified as having an outer circumferential portion 24 and two end portions 26 and 28.

The conductive layer 30 is a material with a high electrical conductance provided to serve as a conductor for the electrical current flowing through and over the rotor 20. The electrical current traveling through and over the rotor should substantially run in the conductive layer in order to minimize current-heat losses.

In an exemplary embodiment, the rotor 20 in the motor 10 has a conductive layer 30 adhered to the outer surface of the shaft body 22 of the rotor 20 using Hot Isostatic Pressing (HIP). In the exemplary embodiment, the rotor 20 is a solid core steel rotor, and the conductive layer 30 is pure or substantially pure copper. The copper layer 30 may have an average thickness of about 1-3 mm, with a preferred embodiment having a thickness of about 1 mm. The ideal copper layer thickness for a particular motor is determined based on variables specific to the motor, e.g., flux path, flux losses, etc.

Figure 2:
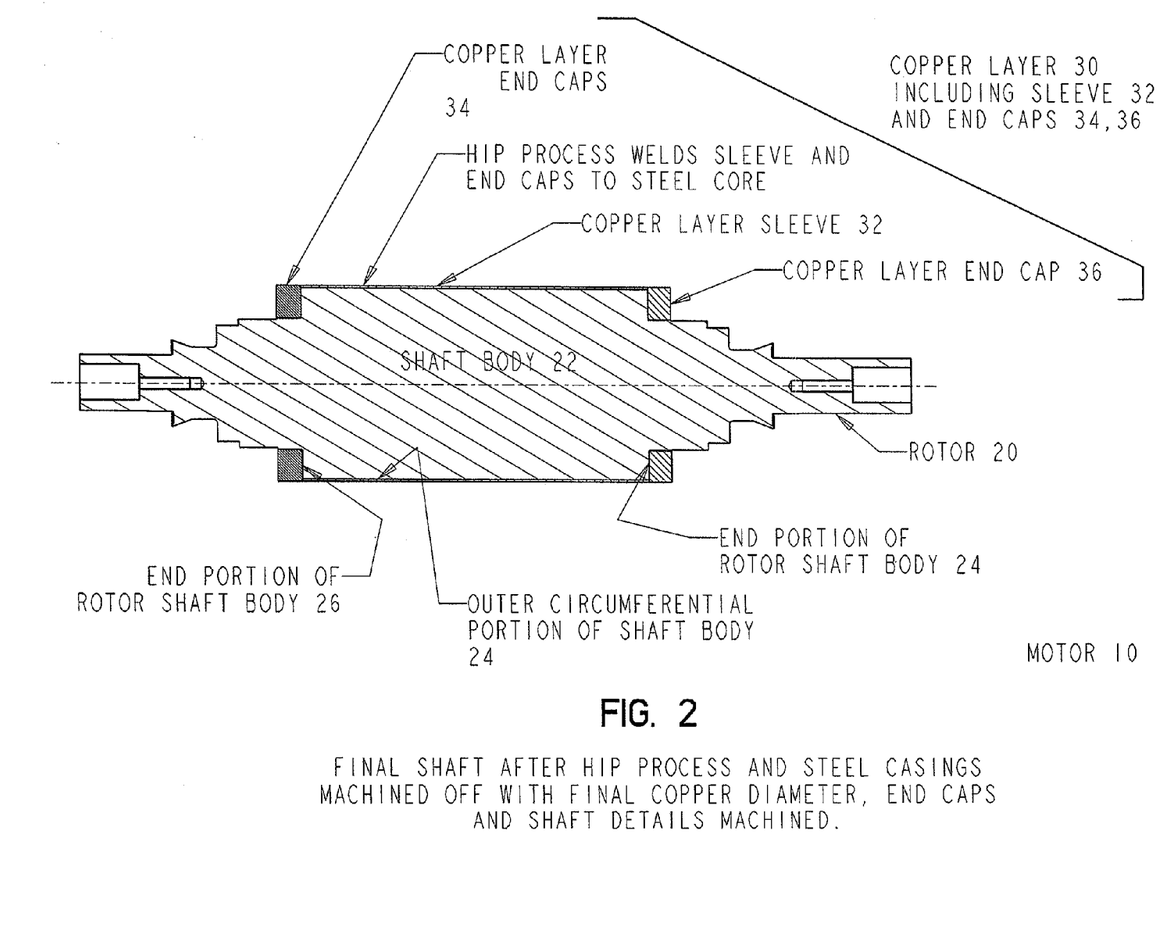
FIG. 2 is a longitudinal section taken through an exemplary steel rotor that is coated with an exemplary conductive layer using the Hot Isostatic Pressing (HIP) process.
Figure 3:
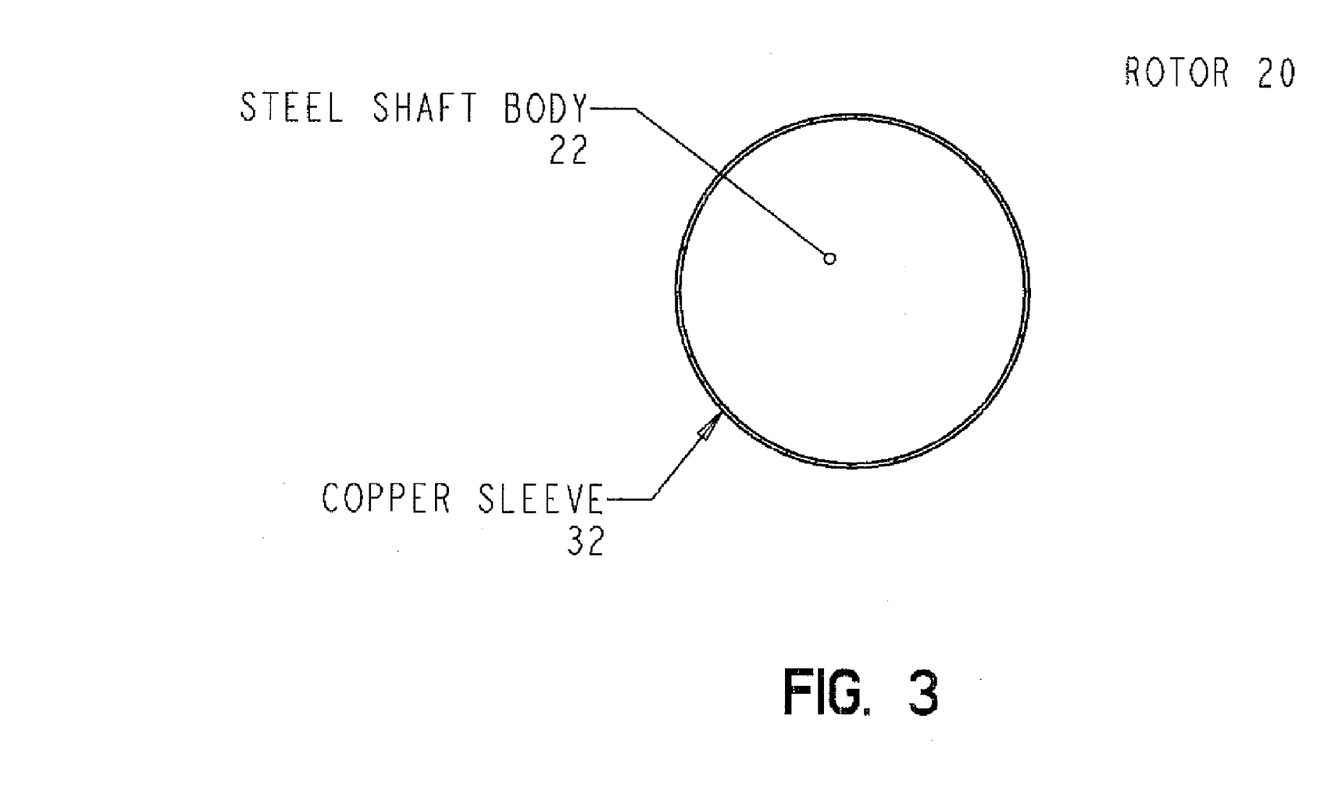
FIG. 3 is a transverse section taken through the middle of an exemplary steel rotor that is coated with an exemplary conductive layer using the HIP process.

FIGS. 2 and 3 illustrate an exemplary shaft body 22 of a rotor 20 coated with an exemplary copper layer 30 using the HIP process. The final copper layer 30—adhered to the shaft body 22—is a single, integral unit, but may be identified as having three portions in an exemplary embodiment: a copper layer sleeve 32 and two copper layer end caps 34 and 36. The copper layer sleeve 32 is disposed on the outer circumferential portion 24 of the shaft body 22 that runs along the stator 50. The copper layer sleeve 32 serves as a conductor for the flux flowing across the air gap 60 to induce a current flow in the conductive layer. The copper layer end caps 34 and 36 are disposed on the end portions 26 and 28, respectively, of the shaft body 22. The copper layer end caps 34 and 26 provide a short circuit flux path across the rotor 20 to engage with complementary stator poles, which is necessary for the induction machine to function. In other exemplary embodiments, the copper layer 30 may be identified as having fewer or more than the above-identified portions.

In an exemplary embodiment, the copper layer 30 has uniform thickness over the shaft body 22, such that the copper layer sleeve 32 and the conductive layer end caps 34 and 36 have the same thickness. In another exemplary embodiment, the copper layer 30 is thicker at the conductive layer end caps 34 and 36 than at the copper layer sleeve 32.

FIG. 2 is a longitudinal section taken through a rotor 20 with a copper layer 30 adhered to the outer surface of the rotor 20. The rotor 20 includes an outer circumferential portion 24 and two end portions 26 and 28. The copper layer sleeve 32 extends over the outer circumferential portion 24 of the shaft body 22 to join electrically with copper layer end caps 34 and 36. In addition, the two copper layer end caps 34 and 36 are electrically attached to the end portions 26 and 28, respectively, of the shaft body 22.

FIG. 3 is a transverse section taken through the middle of a rotor 20 with a copper layer 30 adhered to the outer surface of the rotor 20. The shaft body 22 is a steel body. The outer circumferential portion 24 of the shaft body 22 is coated with the copper layer sleeve 32.

Exemplary embodiments of the present invention avoid the shortcomings of conventional techniques of providing a copper conductive layer on a steel rotor by using the Hot Isostatic Pressing (HIP) process to adhere the copper layer 30 to the shaft body 22 of the rotor 20. The HIP process subjects the outside of a high-pressure containment vessel enclosing the shaft body 22 and the copper layer 30 to both elevated temperature and isostatic gas pressure. The elevated temperature and isostatic gas pressure causes the copper layer 30 to integrally adhere to the shaft body 22.

Figure 4:
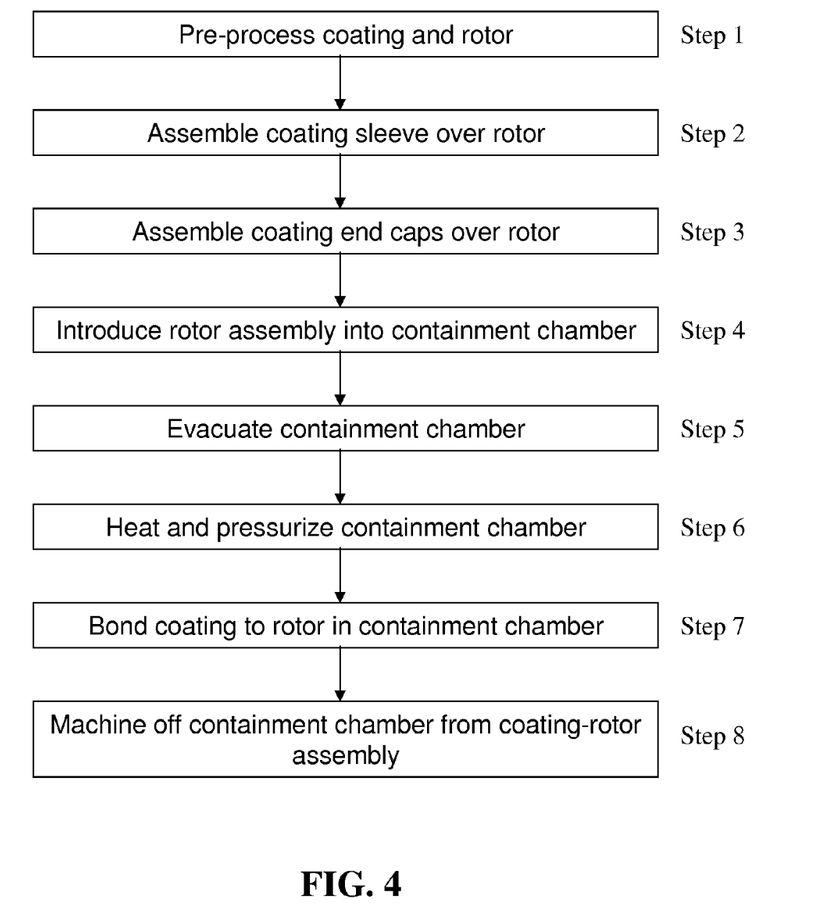
FIG. 4 is a flowchart that illustrates an exemplary method of adhering a conductive layer to a solid core steel rotor using the HIP process.

FIG. 4 is a flowchart that illustrates an exemplary method of adhering the copper layer 30 to the steel shaft body 22 of the rotor 20 using the HIP process. In step 1 of FIG. 4, the copper layer 30 and the rotor 20 are pre-processed before the start of the HIP process. Pre-processing may involve cleaning the copper layer and the rotor to remove contaminants like oil, oxidation, moisture, etc. Pre-processing may also involve ensuring that the copper layer and the rotor are free of contaminants. Pre-processing may further involve sealing the copper layer and the rotor, e.g., in vacuum packs, to ensure that the copper layer and rotor do not become re-contaminated before their transfer to the HIP location.

Figure 5:
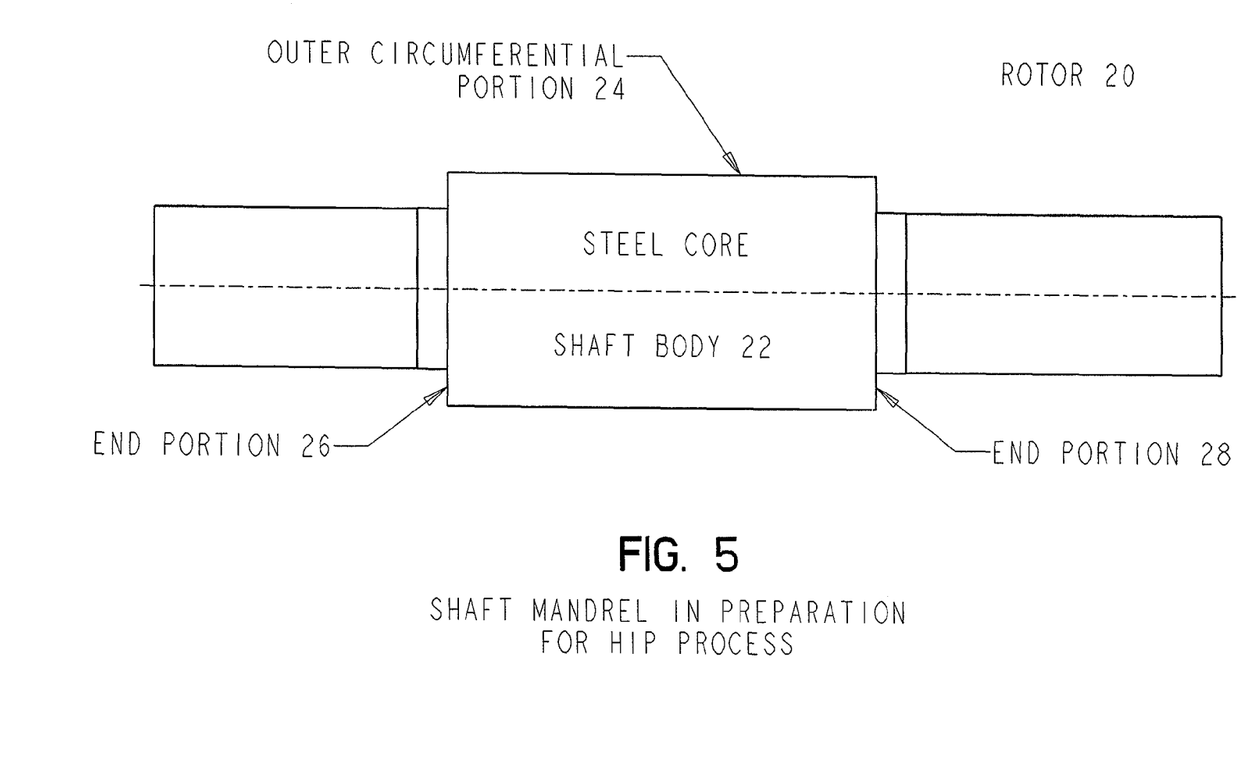
FIG. 5 illustrates an exemplary shaft body of a steel rotor before the rotor is assembled with the conductive layer.
Figure 6:
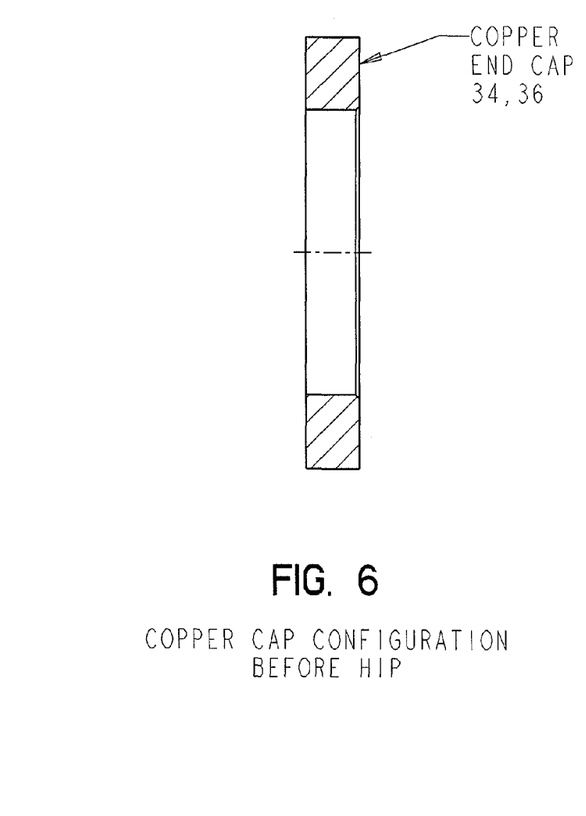
FIG. 6 illustrates an exemplary conductive layer end cap before the conductive layer end cap is assembled with the rotor.
Figure 7:
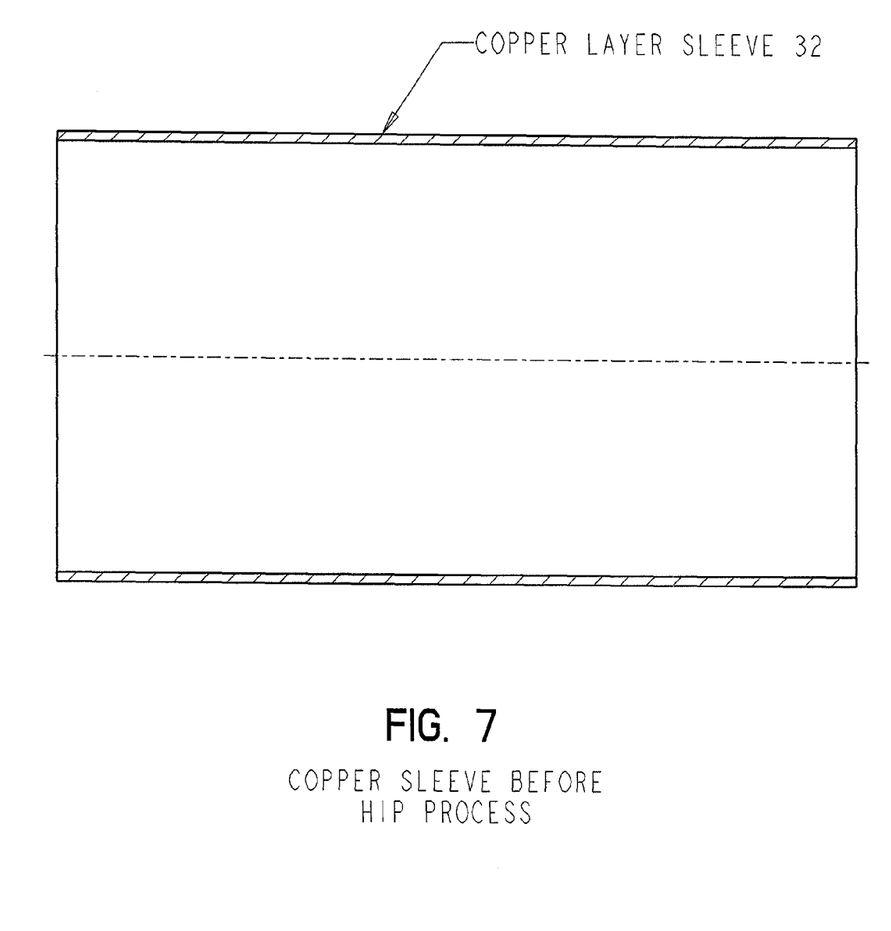
FIG. 7 illustrates an exemplary conductive layer sleeve before the conductive layer sleeve is assembled with the rotor.

FIG. 5 illustrates the shaft body 22 of the rotor 20 before or after pre-processing step 1, i.e., before the rotor is assembled with the copper layer. FIG. 6 illustrates the copper layer end cap 34, 36 before or after pre-processing step 1, i.e., before the copper layer end caps are assembled with the rotor. FIG. 7 illustrates the copper layer sleeve 32 before or after pre-processing step 1, i.e., before the copper layer sleeve is assembled with the rotor.

In steps 2 and 3 of FIG. 4, the copper layer 30 and the rotor 20 are assembled together before the HIP process adheres the copper layer to the rotor. The copper layer sleeve 32 is assembled over the outer circumferential portion 24 of the shaft body 22 of the rotor 20. The copper layer end caps 34 and 36 are assembled over the end portions 26 and 28, respectively, of the shaft body 22 of the rotor 20. In the assembly, the copper layer end caps 34 and 36 abut the copper layer sleeve 32. This negates the need for a stressed weld between the sleeve and the end caps.

Figure 8:
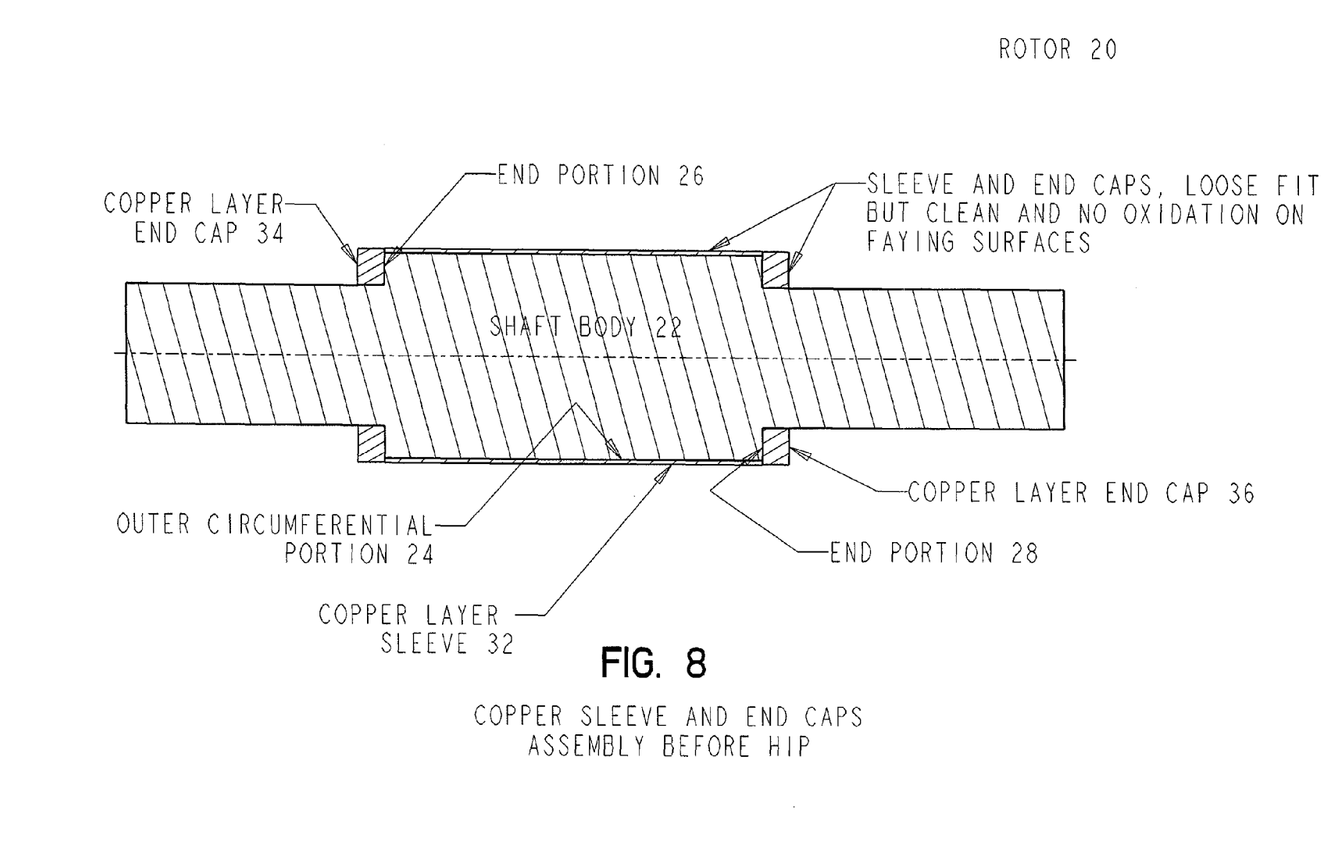
FIG. 8 illustrates the exemplary conductive layer sleeve of FIG. 7 and the conductive layer end caps of FIG. 6 assembled over the exemplary shaft body of FIG. 5.

FIG. 8 illustrates the copper layer sleeve 32 assembled over the outer circumferential portion 24 of the shaft body 22 of the rotor 20, and the copper layer end caps 34 and 36 assembled over the end portions 26 and 28, respectively, of the shaft body 22 of the rotor 20. In this assembly, the copper layer 30 fits loosely over the rotor 20. However, the copper layer and the rotor are clean and free of contaminants, and there is no oxidation on the faying surfaces.

Steps 4-7 of FIG. 4 outline the HIP process. In step 4, the rotor assembly is introduced into the containment chamber 70 of the HIP process. In step 5, the containment chamber is welded to the shaft body 22 assembled with the copper layer 30. A high vacuum is pulled on the containment chamber and the chamber is subjected to high temperatures to remove air and moisture through a gas introduction spigot 72. In an exemplary embodiment, the containment chamber may be purged with an inert gas, such as argon, prior to being evacuated. In step 6, the gas introduction spigot 72 is sealed off and the entire assembly is subjected to high temperature and high pressure.

Figure 9:
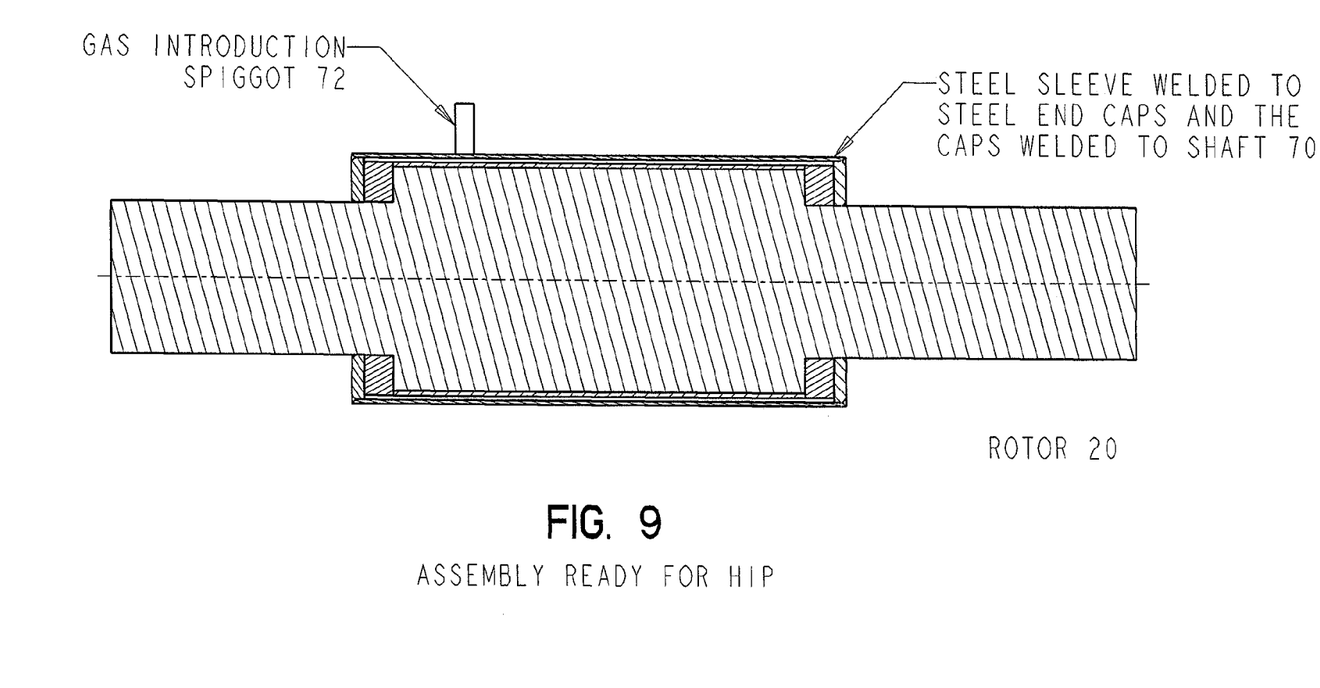
FIG. 9 illustrates an exemplary containment chamber of HIP process that is adhered to the conductive layer and rotor assembly of FIG. 8.

FIG. 9 illustrates an exemplary containment chamber 70 adhered to the rotor assembly, and an exemplary gas introduction spigot 72 attached to the containment chamber 70.

In step 7, the high temperature and high pressure outside the containment chamber causes the copper layer 30 to integrally adhere to the shaft body 22 of the rotor 20. More specifically, the copper layer sleeve 32 adheres integrally to the outer circumferential portion 24 of the shaft body 22, and the copper layer end caps 34 and 36 adheres integrally to the end portions 26 and 28, respectively, of the shaft body 22. The HIP process also adheres the copper layer sleeve 32 to the copper layer end caps 34 and 36 such that the entire copper layer 30 and the rotor 20 is a single integral unit.

The high temperature and high gas pressure employed in the HIP process eliminate internal voids in the copper layer 30, and create a clean and uniform bond between the copper layer 30 and the rotor 20. The resulting copper layer is not porous, which improves its performance as an electrical conductor between the rotor and the stator. The resulting copper layer is also free of contaminants like oxidation, moisture, oil, etc., and is not affected by oxidation on the faying surfaces. These properties also enhance the electrical conductance between the rotor and the stator. Conventional techniques of providing a copper layer on a steel rotor cannot provide these advantageous characteristics.

In step 8 of FIG. 4, after the completion of the HIP process, the containment chamber 70 is machined off from the rotor assembly. FIG. 2 illustrates the rotor assembly after the containment chamber has been machined off.

In another exemplary embodiment, the rotor 20 in the motor 10 has a conductive layer 30 adhered to the outer surface of the shaft body 22 of the rotor 20 using Hot Isostatic Pressing (HIP). The rotor 20 is a solid core steel rotor, and the conductive layer 30 is pure or substantially pure copper. In this exemplary embodiment, an exemplary fan system of the motor 10 includes a set of fan blades 40 affixed to the outer surface of the rotor 20. An exemplary fan system also includes a set of stationary vanes 42 affixed to a fan shroud 44. The fan blades 40 and the stationary vanes 42 are configured to allow incoming air to flow through the air gap 60 substantially in an axial direction. This allows the fan blades 40 to impart a velocity increase to the incoming cooling air, and to increase the static pressure of the incoming air. This induces the incoming air to flow into an opening of the air gap 60 at a high velocity.

Figure 10A:
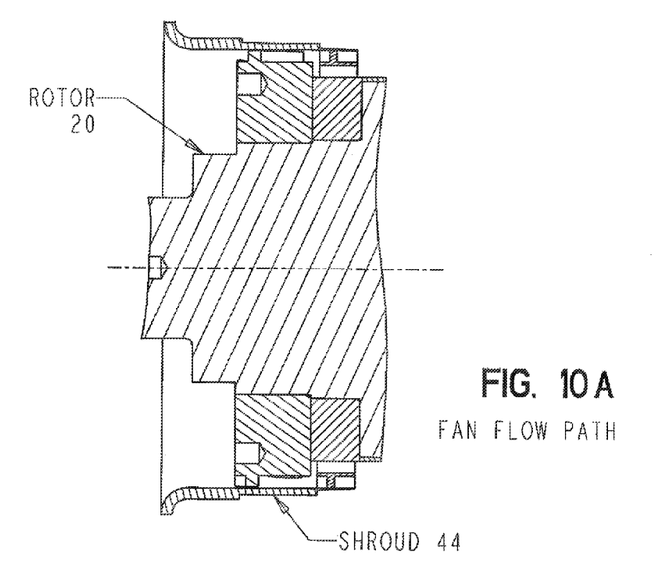
FIG. 10A illustrates a side view of an exemplary motor assembly including a rotor and a fan shroud.
Figure 10B:
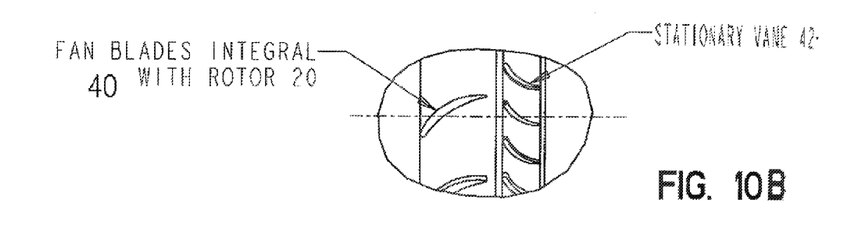
FIG. 10B illustrates a view of a motor fan assembly including a set of fan blades provided integrally with a rotor and a set of stationary vanes affixed to a fan shroud.

FIG. 10A illustrates a side view of an exemplary motor assembly including a rotor 20 and a fan shroud 44. FIG. 10B illustrates a view of a motor fan assembly including a set of fan blades 40 provided integrally with a rotor and a set of stationary vanes 42 affixed to a fan shroud.

Figure 11:
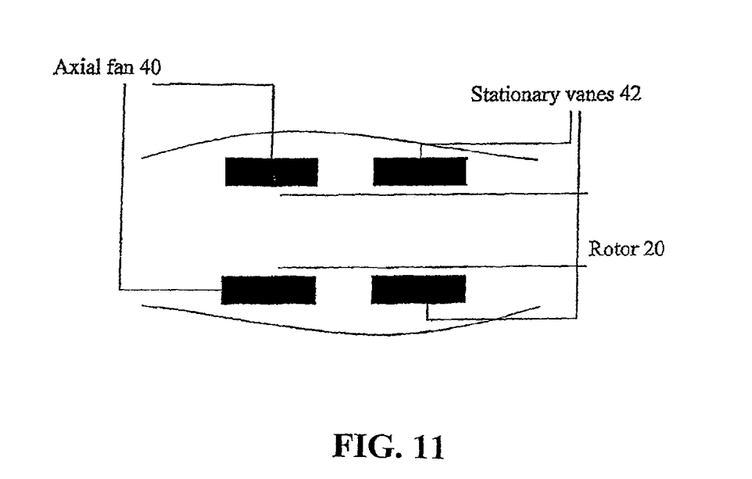
FIG. 11 illustrates an exemplary set of fan blades that are positioned axially along an exemplary rotor.

In an exemplary configuration, illustrated in FIG. 11, the fan blades 40 are positioned axially around the rotor 20, and a set of stationary vanes 42 is used to divert the radial flow into an axial flow along the air gap 60. The incoming air arriving from the axial fan blades 40 has a tangential component and an axial component. The stationary vanes 42 turn the net velocity vector of the incoming air axially. This axial turning of the net velocity vector significantly increases the static pressure, thus inducing the incoming air to flow into an opening of the air gap 60 at high speed and high pressure.

In another exemplary embodiment, the rotor 20 in the motor 10 has an axial fan 40 affixed to the outer surface of the rotor 20 to introduce air axially into the air gap 60. The fan blades 40 are configured to allow incoming air to flow through the air gap 60 substantially in an axial direction. This allows the fan blades 40 to impart a velocity increase to the incoming cooling air, and to increase the static pressure of the incoming air. This induces the incoming air to flow into an opening of the air gap 60 at a high velocity.

Figure 12:
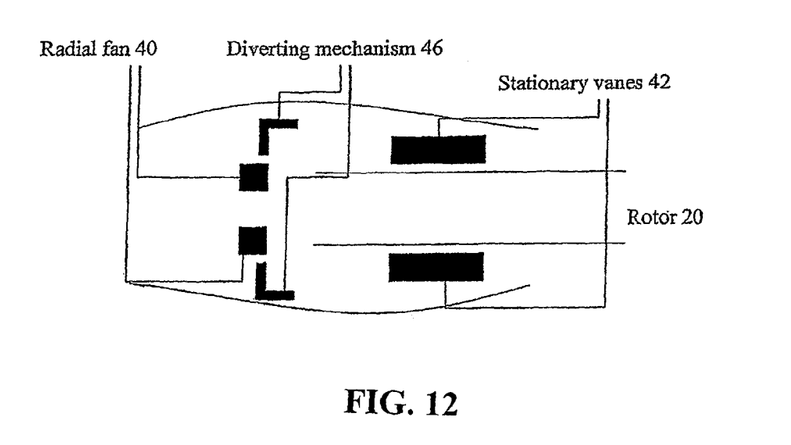
FIG. 12 illustrates an exemplary set of fan blades that are positioned radially on an exemplary rotor, and a set of stationary vanes positioned on the stator to convert the radial flow into an axial flow.

In yet another exemplary configuration, illustrated in FIG. 12, the fan blades 40 are positioned radially on the rotor 20, and a diverting mechanism 46 positioned downstream from the fan blades 40 directs incoming air from a radial direction to an axial direction along the air gap 6. A set of stationary vanes 42 is used to further direct the incoming air into an axial flow along the air gap 60. The set of stationary vanes 42 is provided integrally on the inner surface 54 of the stator 50. The set of stationary vanes 42 is disposed downstream from the fan blades 40 and the diverting mechanism 46.

Figures 13A, 13B, 13C:
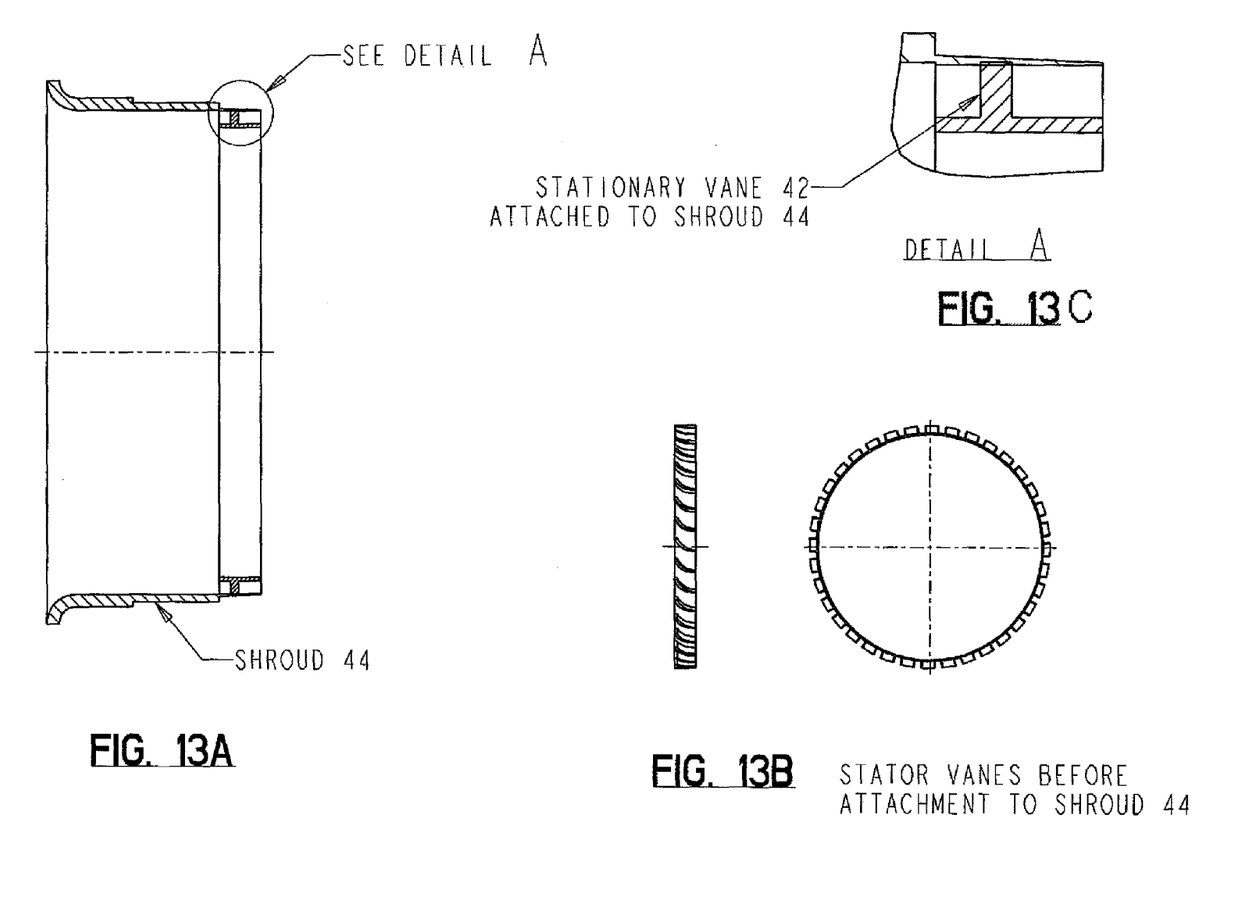
FIG. 13A illustrates an exemplary shroud of a fan system having exemplary stationary vanes affixed thereto.
FIG. 13B illustrates a stationary vanes before being affixed to the exemplary shroud of FIG. 13A.
FIG. 13C illustrates a close-up view of the exemplary stationary vanes affixed to the exemplary shroud of FIG. 13A.

The fan system of the motor includes an exemplary shroud 44 which guides the incoming air into contact with the fan blades 40 and the stationary vanes 42. In exemplary embodiments, the shroud 44 may have an inlet curvature to assist in introducing the incoming air into the rotating blading. In an exemplary embodiment, the shroud 44 may be fixed to the stator winding 56 of the stator 50. FIG. 13A illustrates a longitudinal section taken through an exemplary rotor 20 with an exemplary shroud 44 having exemplary stationary vanes 42 affixed thereto. FIG. 13B illustrates a detailed view of the exemplary vanes 42 before being affixed to the exemplary shroud 44 of FIG. 13A. FIG. 13C illustrates a close-up view of the exemplary stationary vanes 42 affixed to the exemplary shroud 44 of FIG. 13A.

The set of fan blades 40 is affixed to the rotor 20 after the HIP process, i.e., after step 8 of FIG. 4.

In still another exemplary embodiment, an oil system is provided for lubricating the bearings of a motor. The oil system provided by exemplary embodiments is designed and configured to provide lubrication to high-speed motor bearings, while limiting oil flow to prevent heat build-up that can be caused by excessive oil flow.

A motor provided by exemplary embodiments, operating at about 42,000 rpm, requires an oil flow of about 0.0025 liters per minute to lubricate and cool the bearings of the motor. The speed of oil injected into the high-speed bearing needs to be close to the peripheral speed of the bearing, i.e., about 220 feet per second. One conventional methodology of achieving this oil speed uses an oil nozzle to supply the oil to the bearing and raises an upstream oil pressure to about 260 psig. This methodology requires a corresponding nozzle opening of about 0.0015 inches in diameter. Such a small nozzle opening is not suitable for the purposes of lubricating and cooling a motor bearing, as it carries a high risk of blockage and may negatively affect good oil filtering and passage cleanliness in the oil lubrication system.

Another conventional methodology introduces the oil flow to the motor bearing from an oil reservoir via a felt wick. The felt wicks or lifts oil from an oil reservoir. The felt wick is located close to a conical surface on the shaft of the motor that acts as an oil slinger. This methodology may be practical for use with small turbochargers, but the ability of a wick to lift oil from a nearby oil reservoir is limited by the height of the raised portion of the wick from the oil reservoir.

Figure 14:
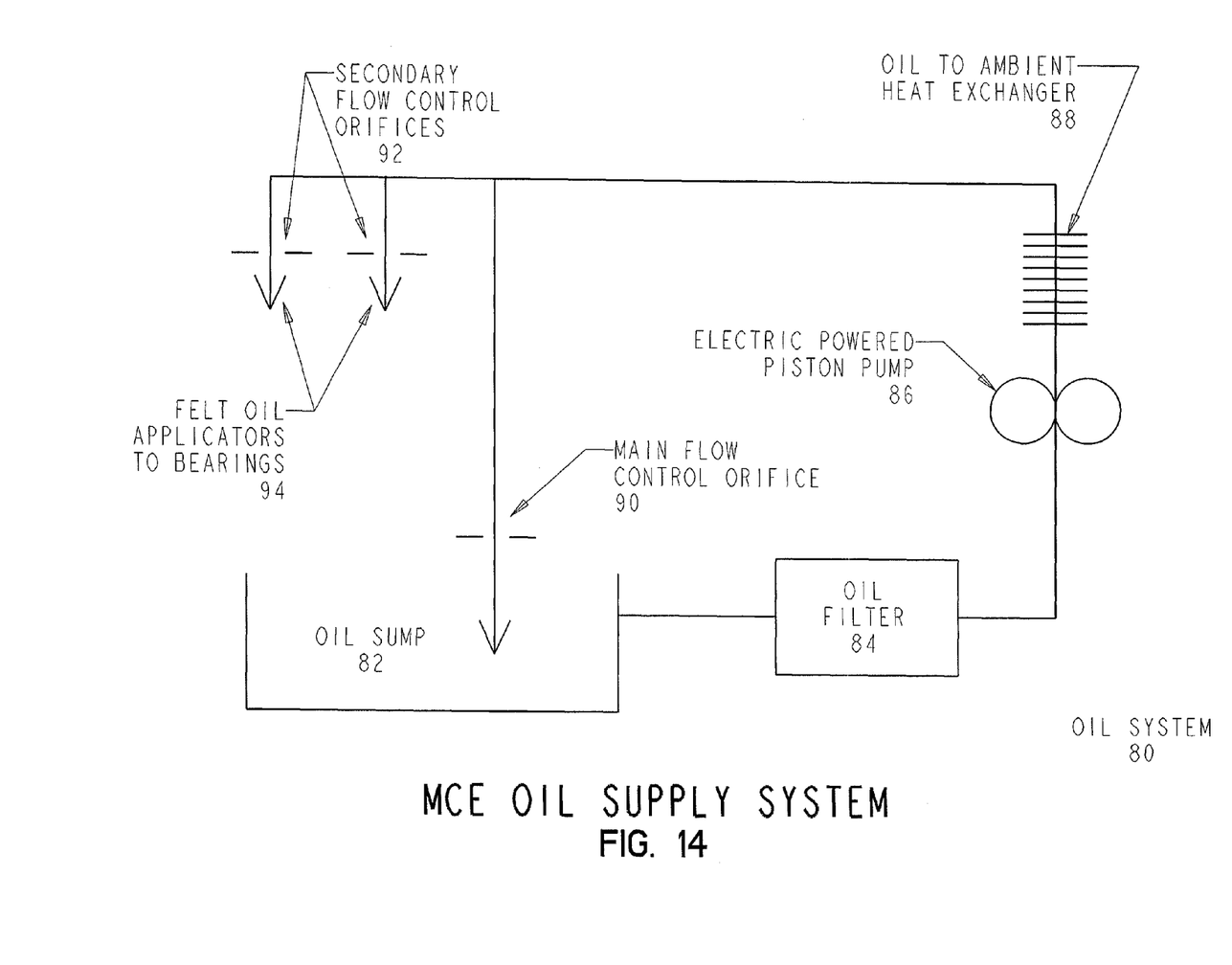
FIG. 14 illustrates an exemplary oil system for lubricating motor bearings.

The oil system taught by exemplary embodiments overcome the limitations of conventional methodologies by using a small oil pump to introduce oil to a wick which then transfers the oil to a motor bearing to lubricate and cool the bearing. FIG. 14 illustrates an exemplary oil system 80 for lubricating motor bearings 14. The oil system 80 includes an oil sump 82 which is a oil reservoir provided at the bottom of the motor. Oil used to lubricate the motor bearings pools in the oil sump 82. Oil from the oil sump 82 is filtered in an oil filter 84 to remove undesirable particles from the oil before it is used to lubricate the bearings.

After filtration, the oil is then pumped by a pump 86, e.g., an electric-powered piston pump, through an oil-to-ambient heat exchanger 88 which cools the oil to be supplied to the motor bearings 14. High temperatures may reduce the viscosity of oil, which makes the oil film too thin for effective lubrication of the bearings. To maintain the viscosity of the oil, the heat exchanger 88 removes excess heat from the oil before it is used in lubricating the motor bearings 14. In an exemplary embodiment, the entire flow of oil pumped by the pump 86 is passed through the heat exchanger 88. A small portion of the pumped flow is directed to the bearings 14, and the balance of the pumped flow is directed to the oil sump 82. The pumped oil flow size (i.e., the flow size of the oil pumped at the pump 86) can be much greater than the oil flow that eventually reaches and that is required by the motor bearings 14. A suitable pump can thus be secured from commonly available pump suppliers.

The filtered and cooled oil is then distributed between two sets of orifices based on the lubrication needs in the motor: one or more main flow control orifices 90 and one or more secondary flow control orifices 92. The main flow control orifices 90 return unused oil to the oil sump 82. The second flow control orifices 92 provide the oil to one or more oil applicators 94 that are in close proximity or contact with an oil slinger 96 (FIG. 15), which, in turn delivers the oil to the motor bearings 14. The oil flows into the oil applicators 94 and is thereupon transferred to the oil slinger 96. In exemplary embodiments, the oil applicators 94 may include a shortened wick through which the oil is transferred to the oil slinger 96. In exemplary embodiments, the oil applicators 94 may include felt which is highly oil absorbent and has great wicking capabilities.

Figure 15:
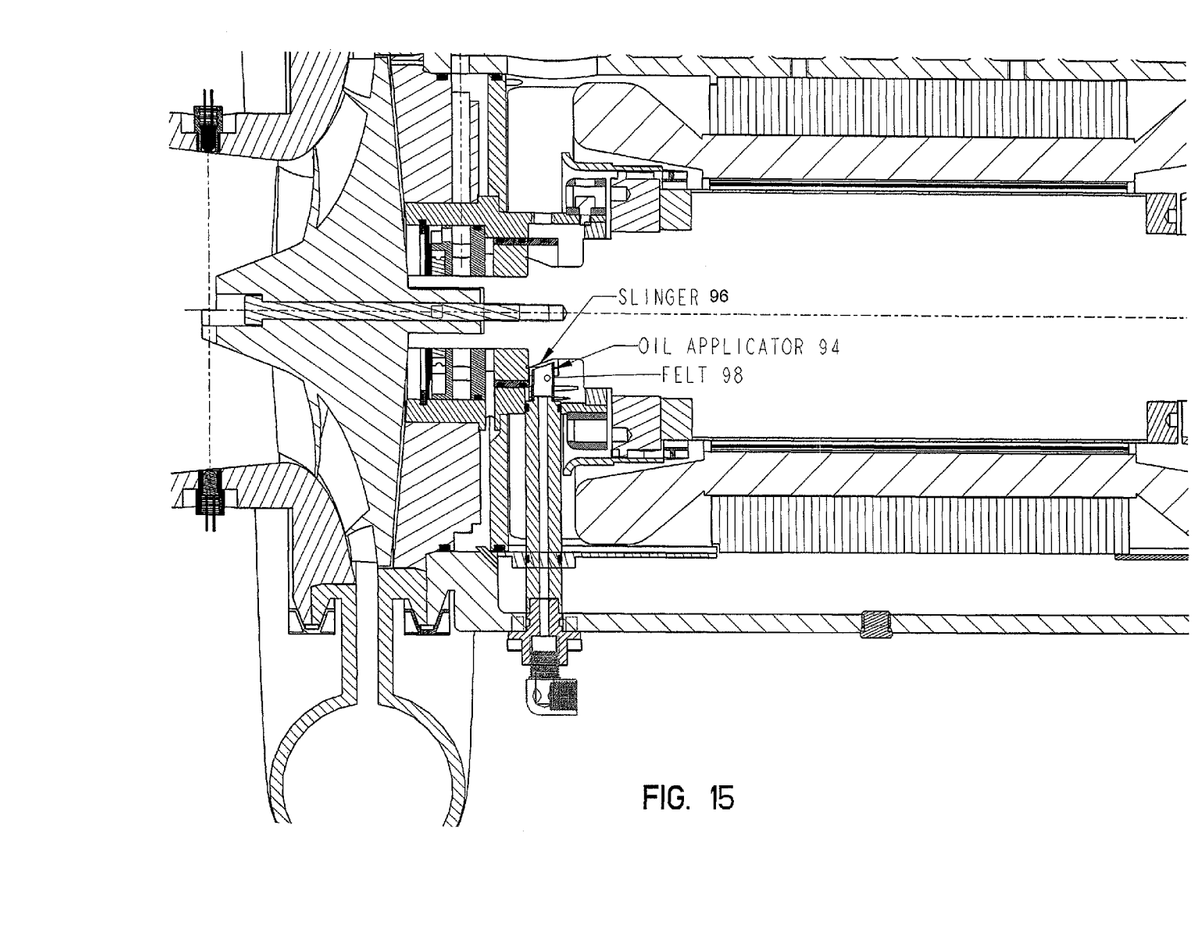
FIG. 15 illustrates a longitudinal section through an exemplary oil applicator in the exemplary oil system of FIG. 14.

FIG. 15 illustrates a longitudinal section through an exemplary oil applicator 94 in the exemplary oil system 80 of FIG. 14. The oil applicator 94 applies oil to the oil slinger 96 which slings the oil arriving through the secondary oil flow control orifices 92. The slinging action transfers the oil to the lip of the oil slinger 96, after which is it deposited onto the bearings 14. The oil applicator 94 is also equipped with one or more pieces of felt 98 which allows uniform distribution of the oil slung by the oil slinger 96, and ensures that an optimum amount of oil is used to lubricate the bearings 14.

In a further exemplary embodiment, a motor 10 is provided with bearings 14 lubricated using the exemplary oil system 80 illustrated in FIGS. 14 and 15.

One of ordinary skill in the art will appreciate that the present invention is not limited to the specific exemplary embodiments described herein. Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. One of ordinary skill in the art will appreciate that any number of the illustrated embodiments may be implemented together. These claims are to be read as including what they set forth literally and also those equivalent elements which are insubstantially different, even though not identical in other respects to what is shown and described in the above illustrations.

I claim:

1. An induction motor, comprising:
   a stator including an inner passage having a longitudinal axis defining a bore;
   a steel rotor rotatably disposed within the bore of the stator, the steel rotor comprising:
      a cylindrical portion extending between a proximal end and a distal end,
      a proximal end portion disposed at the proximal end and extending orthogonally to the cylindrical portion, and
      a distal end portion disposed at the distal end and extending orthogonally to the cylindrical portion; and
   a Hot Isostatic Pressing (HIP) layer of copper integrally adhered to an outer surface of the steel rotor, the HIP layer of copper comprising:
      a cylindrical HIP layer of copper integrally adhered to the cylindrical portion of the rotor,
      a proximal HIP layer of copper integrally adhered to the proximal end portion of the rotor, and
      a distal HIP layer of copper integrally adhered to the distal end portion of the rotor;
   an air gap formed between an outer surface of the HIP layer of copper and an inner surface of the stator and extending along the longitudinal axis of the stator;
   a fan shroud; and
   a fan system, comprising:
      a set of fan blades affixed to an outer surface of the rotor, and
      a set of vanes affixed to the fan shroud;
   wherein the proximal HIP layer of copper and the distal HIP layer of copper are configured to provide a short circuit flux path across the rotor to engage with complementary poles of the stator; and
   wherein the fan blades affixed to the rotor and the vanes affixed to the fan shroud are pneumatically coupled to each other and cooperatively configured to direct cooling air to flow through the air gap axially around the rotor.

2. The induction motor of claim 1, wherein the rotor is a solid core steel rotor.

3. The induction motor of claim 1, further comprising:
   an oil lubrication system for lubricating motor bearings in the induction motor, the oil lubrication system comprising:
      an oil filter for filtering a lubricating oil used for lubricating the motor bearings,
      a heat exchanger for cooling the filtered oil, and
      an oil applicator for transferring the oil onto the motor bearings.

4. The induction motor of claim 1, further comprising:
   an oil applicator for applying a lubricating oil to motor bearings in the induction motor, the oil applicator comprising:
      a piece of felt that allows uniform distribution of the oil in the oil applicator, and
      an oil slinger that slings the oil onto the motor bearings.

5. The induction motor of claim 1, further comprising:
   motor bearings that are lubricated using an oil applicator, the oil applicator comprising:
      a piece of felt that allows uniform distribution of a lubricating oil in the oil applicator, and
      an oil slinger that slings the lubricating oil onto the motor bearings.

\* \* \* \* \*